United States Patent
Bara et al.

(10) Patent No.: US 11,034,794 B2
(45) Date of Patent: Jun. 15, 2021

(54) IONIC POLYESTERS, POLYETHERS, POLY(ETHER SULFONES), AND RELATED MATERIALS

(71) Applicant: The Board of Trustees of the University of Alabama, Tuscaloosa, AL (US)

(72) Inventors: Jason Edward Bara, Tuscaloosa, AL (US); Kathryn Elizabeth O'Harra, Tuscaloosa, AL (US); Grayson Patrick Dennis, Tuscaloosa, AL (US)

(73) Assignee: The Board of Trustees of the University of Alabama, Tuscaloosa, AL (US)

( * ) Notice: Subject to any disclaimer, the term of this patent is extended or adjusted under 35 U.S.C. 154(b) by 143 days.

(21) Appl. No.: 16/544,137

(22) Filed: Aug. 19, 2019

(65) Prior Publication Data

US 2020/0123318 A1    Apr. 23, 2020

Related U.S. Application Data

(60) Provisional application No. 62/747,722, filed on Oct. 19, 2018.

(51) Int. Cl.
| | | |
|---|---|---|
| *C08G 65/332* | (2006.01) | |
| *C08G 63/688* | (2006.01) | |
| *C08G 61/02* | (2006.01) | |
| *C08G 65/325* | (2006.01) | |
| *C08G 61/12* | (2006.01) | |
| *C08G 63/685* | (2006.01) | |

(52) U.S. Cl.
CPC ......... *C08G 65/3328* (2013.01); *C08G 61/02* (2013.01); *C08G 61/124* (2013.01); *C08G 63/685* (2013.01); *C08G 63/688* (2013.01); *C08G 65/325* (2013.01)

(58) Field of Classification Search
CPC .............. C08G 65/3328; C08G 65/325; C08G 63/688; C08G 63/685; C08G 63/6886; C08G 63/6856; C08G 61/02; C08G 61/124; C08G 73/00; C08G 73/0616
See application file for complete search history.

(56) References Cited

FOREIGN PATENT DOCUMENTS

KR    20160066424 A  *  6/2016  ............. B01D 71/52

OTHER PUBLICATIONS

Kammakakam et al.; Macromolecular Research, 2014, vol. 22, No. 8, p. 907-916.*
Mittenthal et al.; Industrial and Engineering Chemistry Research, 2017, p. 5055-5069.*

* cited by examiner

*Primary Examiner* — Robert S Jones, Jr.
(74) *Attorney, Agent, or Firm* — Meunier Carlin & Curfman LLC (57) ABSTRACT

Disclosed herein are ionic polymers incorporating an cationic atom in the polymer backbone.

20 Claims, 1 Drawing Sheet

IONIC POLYESTERS, POLYETHERS, POLY(ETHER SULFONES), AND RELATED MATERIALS

CROSS REFERENCE TO RELATED APPLICATIONS

This application claims priority to U.S. Provisional Application No. 62/747,722, filed Oct. 19, 2018, the contents of which are herein incorporated by reference in its entirety.

STATEMENT OF GOVERNMENT SUPPORT

This invention was made with government support under CBET-1605411 awarded by the National Science Foundation, and DE-SC0018181 awarded by the Department of Energy. The government has certain rights in the invention.

FIELD OF THE INVENTION

The invention is directed to ionic polymers, including ionic polyester, ionic polyethers, poly(ether sulfones) and related systems. The polymers are useful in a variety of contexts, including gas and liquid separation membranes, films/surfaces, coatings, 3-D printing feedstocks, thermally stable materials.

DETAILED DESCRIPTION

Figure 1:
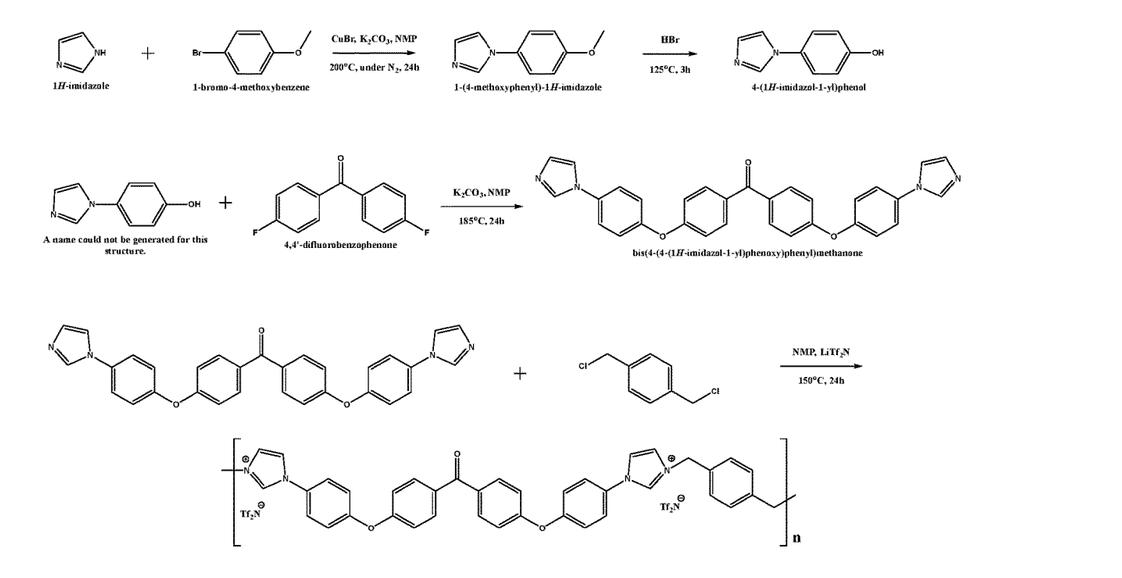
FIG. 1 depicts a synthetic route leading to the inventive polymers.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes¬ from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The term "alkyl" as used herein is a branched or unbranched hydrocarbon group such as methyl, ethyl, n-propyl, isopropyl, n-butyl, isobutyl, t-butyl, pentyl, hexyl, heptyl, octyl, nonyl, decyl, dodecyl, and the like. The alkyl group can also be substituted or unsubstituted. Unless stated otherwise, the term "alkyl" contemplates both substituted and unsubstituted alkyl groups. The alkyl group can be substituted with one or more groups including, but not limited to, alkoxy, alkenyl, alkynyl, cycloalkyl, heterocycloalkyl, aryl, heteroaryl, aldehyde, amino, carboxylic acid, ester, ether, halide, hydroxy, ketone, nitro, silyl, sulfo-oxo, or thiol. An alkyl group which contains no double or triple carbon-carbon bonds is designated a saturated alkyl group, whereas an alkyl group having one or more such bonds is designated an unsaturated alkyl group. Unsaturated alkyl groups having a double bond can be designated alkenyl groups, and unsaturated alkyl groups having a triple bond can be designated alkynyl groups. Unless specified to the contrary, the term alkyl embraces both saturated and unsaturated groups.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is replaced with a heteroatom such as, but not limited to, nitrogen, oxygen, sulfur, selenium or phosphorus. The cycloalkyl group and heterocycloalkyl group can be substituted or unsubstituted. Unless stated otherwise, the terms "cycloalkyl" and "heterocycloalkyl" contemplate both substituted and unsubstituted cyloalkyl and heterocycloalkyl groups. The cycloalkyl group and heterocycloalkyl group can be substituted with one or more groups including, but not limited to, alkyl, alkoxy, alkenyl, alkynyl, cycloalkyl, heterocycloalkyl, aryl, heteroaryl, aldehyde, amino, carboxylic acid, ester, ether, halide, hydroxy, ketone, nitro, silyl, sulfo-oxo, or thiol. A cycloalkyl group which contains no double or triple carbon-carbon bonds is designated a saturated cycloalkyl group, whereas an cycloalkyl group having one or more such bonds (yet is still not aromatic) is designated an unsaturated cycloalkyl group. Unless specified to the contrary, the term cycloalkyl embraces both saturated and unsaturated, non-aromatic, ring systems.

The term "aryl" as used herein is an aromatic ring composed of carbon atoms. Examples of aryl groups include, but are not limited to, phenyl and naphthyl, etc. The term "heteroaryl" is an aryl group as defined above where at least one of the carbon atoms of the ring is replaced with a heteroatom such as, but not limited to, nitrogen, oxygen, sulfur, selenium or phosphorus. The aryl group and heteroaryl group can be substituted or unsubstituted. Unless stated otherwise, the terms "aryl" and "heteroaryl" contemplate both substituted and unsubstituted aryl and heteroaryl groups. The aryl group and heteroaryl group can be substituted with one or more groups including, but not limited to, alkyl, alkoxy, alkenyl, alkynyl, cycloalkyl, heterocycloalkyl, aryl, heteroaryl, aldehyde, amino, carboxylic acid, ester, ether, halide, hydroxy, ketone, nitro, silyl, sulfo-oxo, or thiol.

Exemplary heteroaryl and heterocyclyl rings include: benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH carbazolyl, carbolinyl, chromanyl, chromenyL cirrnolinyl, decahydroquinolinyl, 2H,6H~1,5,2-dithiazinyl, dihydrofuro[2,3 b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydroquinolinyl, tetrazolyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl, and xanthenyl.

The terms "alkoxy," "cycloalkoxy," "heterocycloalkoxy," "cycloalkoxy," "aryloxy," and "heteroaryloxy" have the aforementioned meanings for alkyl, cycloalkyl, heterocycloalkyl, aryl and heteroaryl, further providing said group is connected via an oxygen atom.

As used herein, the term "null," when referring to a possible identity of a chemical moiety, indicates that the group is absent, and the two adjacent groups are directly bond to one another. By way of example, for a genus having the formula $CH_3$—X—$CH_3$, if X is null, then the resulting compound has the formula $CH_3$—$CH_3$.

As used herein, two atoms connected via the symbol ∥ may be connected via a single or double bond.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valencies of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc. Unless specifically stated, a substituent that is said to be "substituted" is meant that the substituent can be substituted with one or more of the following: alkyl, alkoxy, alkenyl, alkynyl, cycloalkyl, heterocycloalkyl, aryl, heteroaryl, aldehyde, amino, carboxylic acid, ester, ether, halide, hydroxy, ketone, nitro, silyl, sulfo-oxo, or thiol. In a specific example, groups that are said to be substituted are substituted with a protic group, which is a group that can be protonated or deprotonated, depending on the pH.

Disclosed herein are ionic polymers having the formula:

wherein $L^1$ and $L^2$ are independently selected from a chemical bond, $C_{1-4}$alkyl, O, or S;

$X^1$ and $X^2$ are independently selected from O and S;

Z is selected from C(O), S(O), $SO_2$, or $P(O)(OR^p)$, wherein $R^p$ is selected from hydrogen, $C_{1-8}$alkyl, aryl, $C_{1-8}$heteroaryl, $C_{3-8}$cycloalkyl, and $C_{1-8}$heterocyclyl;

$Cy^1$, $Cy^2$, $Cy^3$, and $Cy^4$ are independently selected from aryl, $C_{1-8}$heteroaryl, $C_{3-8}$cycloalkyl, or $C_{1-8}$heterocyclyl;

$Q^1$ and $Q^2$ are independently selected from $C_{1-8}$alkyl, $C_{2-8}$alkyl, $C_{2-8}$alkyl, aryl, $C_{1-8}$heteroaryl, $C_{3-8}$cycloalkyl, or $C_{1-8}$heterocyclyl; wherein each of $Q^1$ and $Q^2$ comprise at least one cationic Group 15 atom that is not bonded to a hydrogen atom;

$L^3$ is a linker group; and each A comprises at least one anionic group, and m is an integer such that the polymer is electrically balanced.

Group 15 atoms include nitrogen, phosphorus, arsenic, antimony, and bismuth. In certain embodiments, the Group 15 atom is a nitrogen. In such cases, $Q^1$ and $Q^2$ can independently include a group having the formula:

wherein each R is independently selected from $C_{1-8}$alkyl, $C_{2-8}$alkyl, $C_{2-8}$alkyl, aryl, $C_{1-8}$heteroaryl, $C_{3-8}$cycloalkyl, or $C_{1-8}$heterocyclyl, and two or more R groups may together form a ring.

In certain embodiments, $Q^1$ can include a group having the formula:

wherein $R^{Q1a}$ and $R^{Q1b}$ are independently selected from $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl;

$R^{Q1c}$ and $R^{Q1d}$ are independently selected from null, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl;

wherein any two or more of $R^{Q1a}$, $R^{Q1b}$, $R^{Q1c}$, and $R^{Q1d}$ may together form a ring. Exemplary ring systems include:

It is to be understood that although the above embodiments depict $L^1$ and $L^3$ directly connected to the ring system, systems in which either or both of $L^1$ and $L^3$ are connected via $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl group are also within the scope of the invention.

In certain embodiments, $Q^2$ can include a group having the formula:

wherein $R^{Q2a}$ and $R^{Q2b}$ are independently selected from $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl; $R^{Q2c}$ and $R^{Q2d}$ are independently selected from null, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl;

wherein any two or more of $R^{Q2a}$, $R^{Q2b}$, $R^{Q2c}$, and $R^{Q2d}$ may together form a ring. Exemplary ring systems include:

It is to be understood that although the above embodiments depict $L^2$ and $L^3$ directly connected to the ring system, systems in which either or both of $L^2$ and $L^3$ are connected via $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl group are also within the scope of the invention.

In some instance, $Q^1$ and $Q^2$ can independently include a cationic heterocyclic such as pyrazolium, pyridinium, pyrazinium, pyrimidinium, pryidazinium, piperidinium, pyrrolidinium, indolizinium, isoindolium, indolium, indazolium, imidazolium, oxazolium, triazolium, tetrazolium, thiazolium, purinium, isoquinolinium, quinolinium, phthalazinium, quinooxalinium, phenazinium, morpholininium, and mixtures thereof.

In some embodiments, $Q^1$ can include a cationic heterocycle having the formula:

wherein each R is independently selected from $L^1$, $L^3$, F, Cl, Br, I, $NO_2$, CN, $R^a$, $OR^a$, $N(R^a)_2$, $SO_2R^a$, $SO_2N(R^a)_2$, $C(O)R^a$; $C(O)OR^a$, $OC(O)R^a$; $C(O)N(R^a)_2$, $N(R^a)C(O)R^a$, $OC(O)N(R^a)_2$, $N(R^a)C(O)N(R^a)_2$, wherein $R^a$ is in each case independently selected from hydrogen, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl;

each $R^1$ is independently selected from $L^1$, $L^3$, $R^{a'}$, $OR^a$, $N(R^a)_2$, $SR^a$, $SO_2R^a$, $SO_2N(R^a)_2$, $C(O)R^a$; $C(O)OR^a$, $OC(O)R^a$; $C(O)N(R^a)_2$, $N(R^a)C(O)R^a$, $OC(O)N(R^a)_2$, $N(R^a)C(O)N(R^a)_2$, wherein $R^a$ is in each case independently selected from hydrogen, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl, and $R^{a'}$ is in each case independently selected from $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl, each $R^{1a}$ is selected from null, $L^1$, $L^3$, $R^{a'}$, $OR^a$, $N(R^a)_2$, $SR^a$, $SO_2R^a$, $SO_2N(R^a)_2$, $C(O)R^a$; $C(O)OR^a$, $OC(O)R^a$; $C(O)N(R^a)_2$, $N(R^a)C(O)R^a$, $OC(O)N(R^a)_2$, $N(R^a)C(O)N(R^a)_2$, wherein $R^a$ is in each case independently selected from hydrogen, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl; $R^{a'}$ is in each case independently selected from $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl, wherein any two or more R, $R^1$ and $R^{1a}$ groups may together form a ring, and wherein no $Q^1$ group contains more than one $R^{1a}$, $L^1$ and $L^3$ groups.

In some instances, $Q^2$ can include a cationic heterocycle having the formula:

wherein each R is independently selected from $L^2$, $L^3$, F, Cl, Br, I, $NO_2$, CN, $R^a$, $OR^a$, $N(R^a)_2$, $SR^a$, $SO_2R^a$, $SO_2N(R^a)_2$, $C(O)R^a$; $C(O)OR^a$, $OC(O)R^a$; $C(O)N(R^a)_2$, $N(R^a)C(O)R^a$, $OC(O)N(R^a)_2$, $N(R^a)C(O)N(R^a)_2$, wherein $R^a$ is in each case independently selected from hydrogen, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl;

each $R^1$ is independently selected from $L^2$, $L^3$, $R^{a'}$, $OR^a$, $N(R^a)_2$, $SR^a$, $SO_2R^a$, $SO_2N(R^a)_2$, $C(O)R^a$; $C(O)OR^a$, $OC(O)R^a$; $C(O)N(R^a)_2$, $N(R^a)C(O)R^a$, $OC(O)N(R^a)_2$, $N(R^a)C(O)N(R^a)_2$, wherein $R^a$ is in each case independently selected from hydrogen, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl; and $R^{a'}$ is in each case independently selected from $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl, each $R^{1a}$ is either absent or independently selected from $L^2$, $L^3$, $R^{a'}$, $OR^a$, $N(R^a)_2$, $SR^a$, $SO_2R^a$, $SO_2N(R^a)_2$, $C(O)R^a$; $C(O)OR^a$, $OC(O)R^a$; $C(O)N(R^a)_2$, $N(R^a)C(O)R^a$, $OC(O)N(R^a)_2$, $N(R^a)C(O)N(R^a)_2$, wherein $R^a$ is in each case independently selected from hydrogen, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl; $R^{a'}$ is in each case independently selected from $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl, wherein any two or more R, $R^1$ and $R^{1a}$ groups may together form a ring, and wherein no $Q^2$ group contains more than one $R^{1a}$, $L^2$ and $L^3$ groups.

One particularly preferred heterocycle is imidazolium, such as when $Q^1$ is wherein R is in each case independently selected from F, Cl, Br, I, $NO_2$, CN, $R^a$, $OR^a$, $N(R^a)_2$, $SR^a$, $SO_2R^a$, $SO_2N(R^a)_2$, $C(O)R^a$; $C(O)OR^a$, $OC(O)R^a$; $C(O)N(R^a)_2$, $N(R^a)C(O)R^a$, $OC(O)N(R^a)_2$, $N(R^a)C(O)N(R^a)_2$, wherein $R^a$ is in each case independently selected from hydrogen, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl, wherein any two or more R groups may together form a ring.

In some cases, $Q^2$ can be an imidazolium, e.g., wherein R is in each case independently selected from F, Cl, Br, I, $NO_2$, CN, $R^a$, $OR^a$, $N(R^a)_2$, $SR^a$, $SO_2R^a$, $SO_2N(R^a)_2$, $C(O)R^a$; $C(O)OR^a$, $OC(O)R^a$; $C(O)N(R^a)_2$, $N(R^a)C(O)R^a$, $OC(O)N(R^a)_2$, $N(R^a)C(O)N(R^a)_2$, wherein $R^a$ is in each case independently selected from hydrogen, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl, wherein any two or more R groups may together form a ring.

The $L^3$ linking group can have the formula:

wherein $Y^1$ and $Y^2$ are independently selected from null, O, S, and $-X^3-(CH_2)_n-X^4-$, wherein $X^3$ and $X^4$ are independently selected from null, O, and S, and n is an integer from 0-10; and $L^{3a}$ is selected from $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl.

In certain embodiments, it is preferred than $L^3$ include a phenyl ring, e.g., wherein $Y^1$ and $Y^2$ are independently selected from null, O, S, and $-X^3-(CH_2)_n-X^4-$, wherein $X^3$ and $X^4$ are independently selected from null, O and S, and n is an integer from 0-10; and $R^L$ is independently selected from F, Cl, Br, I, $NO_2$, CN, $R^{aL}$, $OR^{aL}$, $N(R^{aL})_2$, $SR^{aL}$, $SO_2R^{aL}$, $SO_2N(R^{aL})_2$, $C(O)R^{aL}$; $C(O)OR^{aL}$, $OC(O)R^{aL}$; $C(O)N(R^{aL})_2$, $N(R^{aL})C(O)R^{aL}$, $OC(O)N(R^L)_2$, $N(R^{aL})C(O)N(R^{aL})_2$, wherein $R^{aL}$ is in each case independently selected from hydrogen, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl, wherein any two or more $R^L$ groups may together form a ring.

$Y^1$ and $Y^2$ can exist in any regioisomeric relationship. For instance, as 1,4 (para) substituents, 1,3 (meta) substituents, or 1,2 (ortho) substituents.

In preferred embodiments, $R^L$ is in each case hydrogen.

In yet further embodiments, wherein n is in each case 1 and/or $X^3$ and $X^4$ are in each case null. A particularly preferred $L^3$ group is:

In certain embodiments, the ionic polymer can have the formula:

wherein A, m, $Q^1$, $L^1$, $X^2$, Z, $X^2$, $L^2$, $Q^2$, and $L^3$ have the meanings given above;

$R^1$, $R^2$, $R^3$, and $R^4$ are in each case independently selected from F, Cl, Br, I, $NO_2$, CN, $R^a$, $OR^a$, $N(R^a)_2$, $SO_2R^a$, $SO_2N(R^a)_2$, $C(O)R^a$; $C(O)OR^a$, $OC(O)R^a$; $C(O)N(R^a)_2$, $N(R^a)C(O)R^a$, $OC(O)N(R^a)_2$, $N(R^a)C(O)N(R^a)_2$, wherein $R^a$ is in each case independently selected from hydrogen, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl, and wherein any two or more of $R^1$, $R^2$, $R^3$, and $R^4$ can together form a ring.

In certain instances, the ionic polymer can have the formula:

wherein A, m, $Q^1$, $L^1$, $X^2$, Z, $X^2$, $L^2$, $Q^2$, and $L^3$ have the meanings given above;

$R^1$, $R^2$, $R^3$, and $R^4$ are in each case independently selected from F, Cl, Br, I, $NO_2$, CN, $R^a$, $OR^a$, $N(R^a)_2$, $SO_2R^a$, $SO_2N(R^a)_2$, $C(O)R^a$; $C(O)OR^a$, $OC(O)R^a$; $C(O)N(R^a)_2$, $N(R^a)C(O)R^a$, $OC(O)N(R^a)_2$, $N(R^a)C(O)N(R^a)_2$, wherein $R^a$ is in each case independently selected from hydrogen, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl, and wherein any two or more of $R^1$, $R^2$, $R^3$, and $R^4$ can together form a ring.

In some preferred embodiments, $R^1$, $R^2$, $R^3$, and $R^4$ are each case hydrogen.

The anionic species is not particularly limited, provided it electrically balances the cationic charges in the polymer. In some embodiments, A can be chloride, bromide, iodide, nitrate, dicyanamide, acetate, trifluoroacetate, tartrate, succinate, fumarate, citrate, bis(trifluoromethane)sulfonamide, bis(trifluoromethyl sulfonyl)imidate, bis(pentafluoroethanesulfonyl)imidate, hexafluorophosphate, tetrafluoroborate, sulfate, ethylsulfate, formate, phosphate, tris(perfluoroalkyl)trifluorophosphatemesylate, aluminum chloride, thiocyanide, mesylate, triflate, glycinate, alaninate, methioninate, prolinate, taurine, lactate, benzoate, pivalate, or tosylate.

Examples

The following examples are for the purpose of illustration of the invention only and are not intended to limit the scope of the present invention in any manner whatsoever.

Preparation of Imidazole Phenol Monomer

Synthesis of 1-(4-methoxyphenyl)-1H-imidazole

Imidazole (50.00 g, 0.73 mol), copper bromide (3.51 g, 25 mmol), and potassium carbonate (81.20 g, 586 mmol) were added under $N_2$ to a 1000 mL round-bottom-flask equipped with a magnetic stir bar. N-methyl pyrrolidone (NMP) (300 mL) was added to the flask and the reaction was heated to reflux for 24 hours. The reaction was cooled to 140° C. and some of the NMP was removed via vacuum distillation. The reaction was cooled to room temperature and the solids were filtered. The product was extracted into dichloromethane (DCM) and washed with aq. NaOH. The organic layer was then dried with magnesium sulfate and filtered. The solvent was removed via rotary evaporation. The product was recrystallized from toluene/cyclohexane. The product was dried to yield 58.43 g of tan crystals.

Synthesis of 4-(1H-imidazol-1-yl)phenol 1-(4-methoxyphenyl)-1H-imidazole (58.43 g, 335 mmol) was added to a heavy-walled round-bottom-flask with 200 mL of HBr (40% in water). The flask was sealed with a threaded PTFE cap and DuPont Kalrez O-ring. The reaction vessel was heated to 125° C. for 3 hours. The reaction was cooled and neutralized with $NaHCO_3$. The product was filtered and dried to yield 28.98 g as an off-white powder.

Preparation of Imidazole Ether Ketone Ether Monomer 4-(1H-imidazol-1-yl)phenol (10.00 g, 66 mmol), potassium carbonate (4.529 g, 31 mmol), and 4,4'-difluorobenzophenone (6.81 g, 31 mmol) were dissolved in 100 mL of NMP in a heavy-walled round-bottom-flask equipped with a magnetic stir bar. The flask was sealed with a threaded PTFE cap and DuPont Kalrez O-ring. The reaction was heated to 185° C. for 24 hours. The reaction was cooled to room temperature and poured into DI water to precipitate the product. The precipitate was filtered and dried at 100° C. in a vacuum oven. The product was recrystallized in toluene at reflux and filtered, to yield a light tan powder.

Preparation of the Polymer Product

The bis(4-(4-(1H-imidazol-1-yl)phenoxy)phenyl)methanone monomer (2.50 g, 5 mmol), α,α'-dichloro-p-xylene (0.88 g, 5 mmol), and lithium bistriflimide ($LiTf_2N$) (4.32 g, 15 mmol) were dissolved in 50 mL of NMP in a heavy-walled round-bottom-flask equipped with a magnetic stir bar. The flask was sealed with a threaded PTFE cap and DuPont Kalrez O-ring. The reaction was heated to 150° C. for 48 hours. The reaction was cooled to room temperature and poured into DI water to precipitate the product. The precipitate was filtered and dried at 150° C. in a vacuum oven, to yield the product as a coarse tan powder.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. An ionic polymer having the formula:

wherein $L^1$ and $L^2$ are independently selected from a chemical bond, $C_{1-4}$alkyl, O, or S;
$X^1$ and $X^2$ are independently selected from O and S;
Z is selected from C(O), S(O), $SO_2$, or P(O)($OR^p$), wherein $R^p$ is selected from hydrogen, $C_{1-8}$ alkyl, aryl, $C_{1-8}$heteroaryl, $C_{3-8}$cycloalkyl, and $C_{1-8}$heterocyclyl;
$Cy^1$, $Cy^2$, $Cy^3$, and $Cy^4$ are independently selected from aryl, $C_{1-8}$heteroaryl, $C_{3-8}$cycloalkyl, or $C_{1-8}$heterocyclyl;
$Q^1$ and $Q^2$ are independently selected from $C_{1-8}$alkyl, $C_{2-8}$alkyl, $C_{2-8}$alkyl, aryl, $C_{1-8}$heteroaryl, $C_{3-8}$cycloalkyl, or $C_{1-8}$heterocyclyl; wherein each of $Q^1$ and $Q^2$ comprise at least one cationic Group 15 atom that is not bonded to a hydrogen atom;
$L^3$ is a linker group; and
each A comprises at least one anionic group, and m is a integer such that the polymer is electrically balanced.

2. The polymer of claim 1, wherein $Q^1$ and $Q^2$ independently comprise a group having the formula:

wherein each R is independently selected from $C_{1-8}$alkyl, $C_{2-8}$alkyl, $C_{2-8}$alkyl, aryl, $C_{1-8}$heteroaryl, $C_{3-8}$cycloalkyl, or $C_{1-8}$heterocyclyl, and two or more R groups may together form a ring.

3. The polymer of claim 1, wherein $Q^1$ comprises a group having the formula:

wherein $R^{Q1a}$ and $R^{Q1b}$ are independently selected from $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl;
$R^{Q1c}$ and $R^{Q1d}$ are independently selected from null, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl;
wherein any two or more of $R^{Q1a}$, $R^{Q1b}$, $R^{Q1c}$, and $R^{Q1d}$ may together form a ring.

4. The polymer of claim 1, wherein $Q^2$ comprises a group having the formula:

wherein $R^{Q2a}$ and $R^{Q2b}$ are independently selected from $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl;
$R^{Q2c}$ and $R^{Q2d}$ are independently selected from null, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl;
wherein any two or more of $R^{Q2a}$, $R^{Q2b}$, $R^{Q2c}$, and $R^{Q2d}$ may together form a ring.

5. The polymer of claim 1, wherein $Q^1$ and $Q^2$ independently comprise a cationic heterocyclic selected from the group consisting of pyrazolium, pyridinium, pyrazinium, pyrimidinium, pryidazinium, piperidinium, pyrrolidinium, indolizinium, isoindolium, indolium, indazolium, imidazolium, oxazolium, triazolium, tetrazolium, thiazolium, purinium, isoquinolinium, quinolinium, phthalazinium, quinooxalinium, phenazinium, morpholininium, and mixtures thereof.

6. The polymer of claim 1, wherein $Q^1$ comprises a cationic heterocycle having the formula:

wherein
each R is independently selected from L$^1$, L$^3$, F, Cl, Br, I, NO$_2$, CN, R$^a$, OR$^a$, N(R$^a$)$_2$, SO$_2$R$^a$, SO$_2$N(R$^a$)$_2$, C(O)R$^a$; C(O)OR$^a$, OC(O)R$^a$; C(O)N(R$^a$)$_2$, N(R$^a$)C(O)R$^a$, OC(O)N(R$^a$)$_2$, N(R$^a$)C(O)N(R$^a$)$_2$, wherein R$^a$ is in each case independently selected from hydrogen, C$_{1-8}$alkyl, C$_{2-8}$alkenyl, C$_{2-8}$alkynyl, aryl, C$_{1-8}$heteroaryl, C$_{3-8}$cycloalkyl, or C$_{1-8}$heterocyclyl;

each R$^1$ is independently selected from L$^1$, L$^3$, R$^{a'}$, OR$^a$, N(R$^a$)$_2$, SR$^a$, SO$_2$R$^a$, SO$_2$N(R$^a$)$_2$, C(O)R$^a$; C(O)OR$^a$, OC(O)R$^a$; C(O)N(R$^a$)$_2$, N(R$^a$)C(O)R$^a$, OC(O)N(R$^a$)$_2$, N(R$^a$)C(O)N(R$^a$)$_2$, wherein R$^a$ is in each case independently selected from hydrogen, C$_{1-8}$alkyl, C$_{2-8}$alkenyl, C$_{2-8}$alkynyl, aryl, C$_{1-8}$heteroaryl, C$_{3-8}$cycloalkyl, or C$_{1-8}$heterocyclyl, and R$^{a'}$ is in each case independently selected from C$_{1-8}$alkyl, C$_{2-8}$alkenyl, C$_{2-8}$alkynyl, aryl, C$_{1-8}$heteroaryl, C$_{3-8}$cycloalkyl, or C$_{1-8}$heterocyclyl, each R$^{1a}$ is selected from null, L$^1$, L$^3$, R$^{a'}$, OR$^a$, N(R$^a$)$_2$, SR$^a$, SO$_2$R$^a$, SO$_2$N(R$^a$)$_2$, C(O)R$^a$; C(O)OR$^a$, OC(O)R$^a$; C(O)N(R$^a$)$_2$, N(R$^a$)C(O)R$^a$, OC(O)N(R$^a$)$_2$, N(R$^a$)C(O)N(R$^a$)$_2$, wherein R$^a$ is in each case independently selected from hydrogen, C$_{1-8}$alkyl, C$_{2-8}$alkenyl, C$_{2-8}$alkynyl, aryl, C$_{1-8}$heteroaryl, C$_{3-8}$cycloalkyl, or C$_{1-8}$heterocyclyl; R$^{a'}$ is in each case independently selected from C$_{1-8}$alkyl, C$_{2-8}$alkenyl, C$_{2-8}$alkynyl, aryl, C$_{1-8}$heteroaryl, C$_{3-8}$cycloalkyl, or C$_{1-8}$heterocyclyl, wherein any two or more R, R$^1$ and R$^{1a}$ groups may together form a ring, and wherein no Q$^1$ group contains more than one R$^{1a}$, L$^1$ and L$^3$ groups.

7. The polymer of claim 1, wherein Q$^2$ comprises a cationic heterocycle having the formula:

wherein each R is independently selected from L$^2$, L$^3$, F, Cl, Br, I, NO$_2$, CN, R$^a$, OR$^a$, N(R$^a$)$_2$, SR$^a$, SO$_2$R$^a$, SO$_2$N(R$^a$)$_2$, C(O)R$^a$; C(O)OR$^a$, OC(O)R$^a$; C(O)N(R$^a$)$_2$, N(R$^a$)C(O)R$^a$, OC(O)N(R$^a$)$_2$, N(R$^a$)C(O)N(R$^a$)$_2$, wherein R$^a$ is in each case independently selected from hydrogen, C$_{1-8}$alkyl, C$_{2-8}$alkenyl, C$_{2-8}$alkynyl, aryl, C$_{1-8}$heteroaryl, C$_{3-8}$cycloalkyl, or C$_{1-8}$heterocyclyl;

each R$^1$ is independently selected from L$^2$, L$^3$, R$^{a'}$, OR$^a$, N(R$^a$)$_2$, SR$^a$, SO$_2$R$^a$, SO$_2$N(R$^a$)$_2$, C(O)R$^a$; C(O)OR$^a$, OC(O)R$^a$; C(O)N(R$^a$)$_2$, N(R$^a$)C(O)R$^a$, OC(O)N(R$^a$)$_2$, N(R$^a$)C(O)N(R$^a$)$_2$, wherein R$^a$ is in each case independently selected from hydrogen, C$_{1-8}$alkyl, C$_{2-8}$alkenyl, C$_{2-8}$alkynyl, aryl, C$_{1-8}$heteroaryl, C$_{3-8}$cycloalkyl, or C$_{1-8}$heterocyclyl; and R$^{a'}$ is in each case independently selected from C$_{1-8}$alkyl, C$_{2-8}$alkenyl, C$_{2-8}$alkynyl, aryl, C$_{1-8}$heteroaryl, C$_{3-8}$cycloalkyl, or C$_{1-8}$heterocyclyl, each R$^{1a}$ is either absent or independently selected from L$^2$, L$^3$, R$^{a'}$, OR$^a$, N(R$^a$)$_2$, SR$^a$, SO$_2$R$^a$, SO$_2$N(R$^a$)$_2$, C(O)R$^a$; C(O)OR$^a$, OC(O)R$^a$; C(O)N(R$^a$)$_2$, N(R$^a$)C(O)R$^a$, OC(O)N(R$^a$)$_2$, N(R$^a$)C(O)N(R$^a$)$_2$, wherein R$^a$ is in each case independently selected from hydrogen, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl;

$R^{a'}$ is in each case independently selected from $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl, wherein any two or more R, $R^1$ and $R^{1a}$ groups may together form a ring, and wherein no $Q^2$ group contains more than one $R^{1a}$, $L^2$ and $L^3$ groups.

8. The polymer of claim 1, wherein $Q^1$ is wherein R is in each case independently selected from F, Cl, Br, I, $NO_2$, CN, $R^a$, $OR^a$, $N(R^a)_2$, $SR^a$, $SO_2R^a$, $SO_2N(R^a)_2$, $C(O)R^a$; $C(O)OR^a$, $OC(O)R^a$; $C(O)N(R^a)_2$, $N(R^a)C(O)R^a$, $OC(O)N(R^a)_2$, $N(R^a)C(O)N(R^a)_2$, wherein $R^a$ is in each case independently selected from hydrogen, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl, wherein any two or more R groups may together form a ring.

9. The polymer of claim 1, wherein $Q^2$ is wherein R is in each case independently selected from F, Cl, Br, I, $NO_2$, CN, $R^a$, $OR^a$, $N(R^a)_2$, $SR^a$, $SO_2R^a$, $SO_2N(R^a)_2$, $C(O)R^a$; $C(O)OR^a$, $OC(O)R^a$; $C(O)N(R^a)_2$, $N(R^a)C(O)R^a$, $OC(O)N(R^a)_2$, $N(R^a)C(O)N(R^a)_2$, wherein $R^a$ is in each case independently selected from hydrogen, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl, wherein any two or more R groups may together form a ring.

10. The polymer of claim 1, wherein $L^3$ has the formula:

wherein $Y^1$ and $Y^2$ are independently selected from null, O, S, and $—X^3—(CH_2)_n—X^4—$, wherein $X^3$ and $X^4$ are independently selected from null, O, and S, and n is an integer from 0-10; and $L^{3a}$ is selected from $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl.

11. The polymer of claim 1, wherein $L^3$ has the formula:

wherein $Y^1$ and $Y^2$ are independently selected from null, O, S, and $—X^3—(CH_2)_n—X^4—$, wherein $X^3$ and $X^4$ are independently selected from null, O and S, and n is an integer from 0-10; and $R^L$ is independently selected from F, Cl, Br, I, $NO_2$, CN, $R^{aL}$, $OR^{aL}$, $N(R^{aL})_2$, $SR^{aL}$, $SO_2R^{aL}$, $SO_2N(R^{aL})_2$, $C(O)R^{aL}$; $C(O)OR^{aL}$, $OC(O)R^{aL}$; $C(O)N(R^{aL})_2$, $N(R^{aL})C(O)R^{aL}$, $OC(O)N(R^{aL})_2$, $N(R^{aL})C(O)N(R^{aL})_2$, wherein $R^{aL}$ is in each case independently selected from hydrogen, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl, wherein any two or more $R^L$ groups may together form a ring.

12. The polymer of claim 11, wherein $Y^1$ is para to $Y^2$.

13. The polymer of claim 11, wherein $R^L$ is in each case hydrogen.

14. The polymer of claim 11, wherein $Y^1$ and $Y^2$ are each $—X^3—(CH_2)—X^4—$, wherein $X^3$ and $X^4$ are independently selected from null, O and S.

15. The polymer of claim 14, wherein $X^3$ and $X^4$ are in each case null.

16. The polymer of claim 1, wherein $L^3$ has the structure:

17. The polymer of claim 1, having the formula:

$R^1$, $R^2$, $R^3$, and $R^4$ are in each case independently selected from F, Cl, Br, I, $NO_2$, CN, $R^a$, $OR^a$, $N(R^a)_2$, $SO_2R^a$, $SO_2N(R^a)_2$, $C(O)R^a$; $C(O)OR^a$, $OC(O)R^a$; $C(O)N(R^a)_2$, $N(R^a)C(O)R^a$, $OC(O)N(R^a)_2$, $N(R^a)C(O)N(R^a)_2$, wherein $R^a$ is in each case independently selected from hydrogen, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl.

18. The polymer of claim 1, having the formula:

$R^1$, $R^2$, $R^3$, and $R^4$ are in each case independently selected from F, Cl, Br, I, $NO_2$, CN, $R^a$, $OR^a$, $N(R^a)_2$, $SO_2R^a$, $SO_2N(R^a)_2$, $C(O)R^a$; $C(O)OR^a$, $OC(O)R^a$; $C(O)N(R^a)_2$, $N(R^a)C(O)R^a$, $OC(O)N(R^a)_2$, $N(R^a)C(O)N(R^a)_2$, wherein $R^a$ is in each case independently selected from hydrogen, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl.

19. The polymer of claim 18, wherein $R^1$, $R^2$, $R^3$, and $R^4$ are each hydrogen.

20. The polymer of claim 1, wherein A is chloride, bromide, iodide, nitrate, dicyanamide, acetate, trifluoroacetate, tartrate, succinate, fumarate, citrate, bis(trifluoromethane)sulfonamide, bis(trifluoromethylsulfonyl)imidate, hexafluorophosphate, tetrafluoroborate, sulfate, ethylsulfate, formate, phosphate, tris(perfluoroalkyl)trifluorophosphate-mesylate, aluminum chloride, thiocyanide, mesylate, triflate, glycinate, alanate, methioninate, prolinate, taurine, lactate, benzoate, pivalate, or tosylate.

* * * * *